United States Patent [19]

Metzger, Jr. et al.

[11] Patent Number: 4,846,036

[45] Date of Patent: Jul. 11, 1989

[54] RIP FENCE FOR TABLE SAW

[75] Inventors: James I. Metzger, Jr.; Roger O. Claghorn, both of County of St. Louis, Mo.

[73] Assignee: Emerson Electric Co., St. Louis, Mo.

[21] Appl. No.: 222,557

[22] Filed: Jul. 21, 1988

[51] Int. Cl.⁴ ............................................. B27B 27/02
[52] U.S. Cl. ........................................ 83/438; 83/444; 83/477.2
[58] Field of Search ...................... 83/438, 444, 477.2

[56] References Cited

U.S. PATENT DOCUMENTS

| | | | |
|---|---|---|---|
| 2,265,335 | 12/1941 | Aumann | 83/438 |
| 2,521,302 | 9/1950 | Musselman | 83/438 |
| 2,556,548 | 6/1951 | Modderman | 83/438 |
| 2,630,845 | 3/1953 | Eschenburg | 83/438 |
| 2,677,400 | 5/1954 | Gaskell | 83/438 |
| 2,966,179 | 12/1960 | Gaskell | 83/438 |
| 3,011,531 | 12/1961 | Gaskell | 83/438 |

Primary Examiner—Donald R. Schran

Attorney, Agent, or Firm—Polster, Polster and Lucchesi

[57] ABSTRACT

A rip fence for use with a table saw or the like having a rotatable saw blade extending through its upper surface is disclosed. The rip fence holds a workpiece in position relative to the rotatable saw blade for longitudinal or rip cutting along the length of the workpiece. The rip fence includes depending front and rear clamps which are operatively connected for simultaneous releasable clamping engagement with corresponding surfaces of the table saw. For adjusting of the rip fence, the front and rear clamps are unlocked, and a spring biased lever maintains the rip fence in squared relationship to the table, while permitting adjustment relative to the rotatable saw blade. Removal and storage of the rip fence, when not in use, is also facilitated by de-activating the spring biased lever. The locking, unlocking and release of the rip fence relative to the table saw is achieved by the use of a pivoting handle which is moved from a locked to an unlocked and also a released position, for the purposes desired.

20 Claims, 3 Drawing Sheets

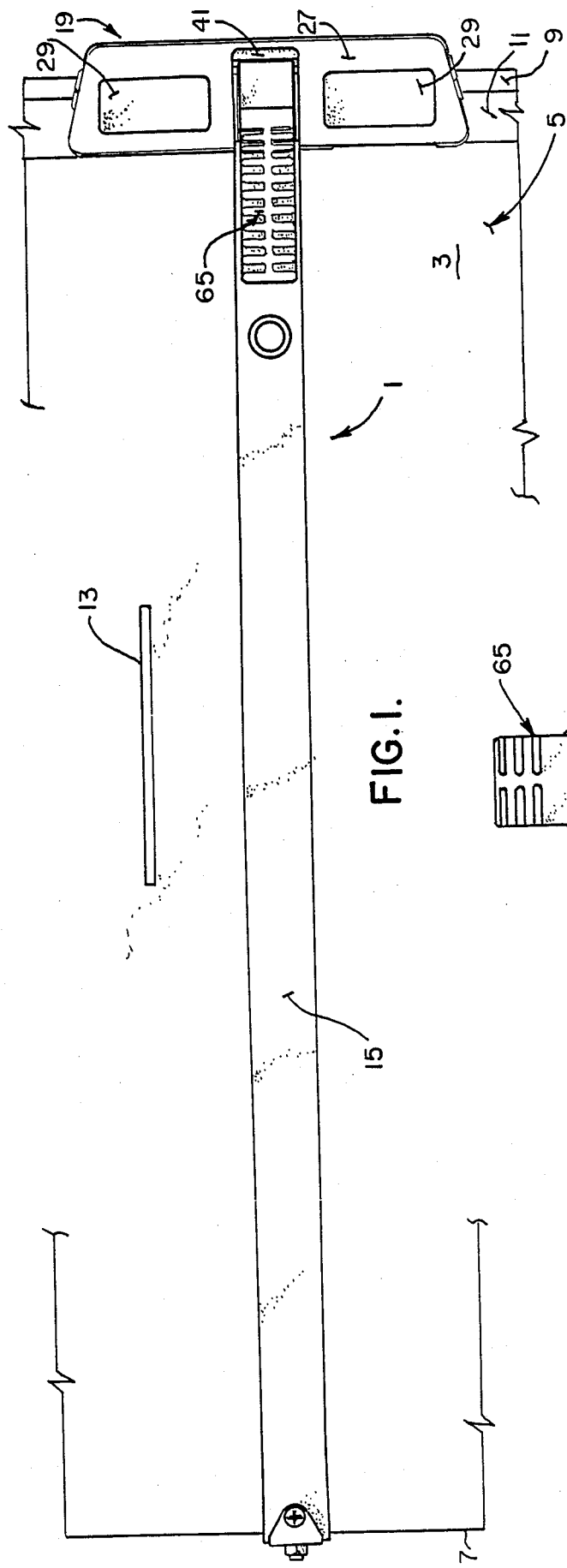
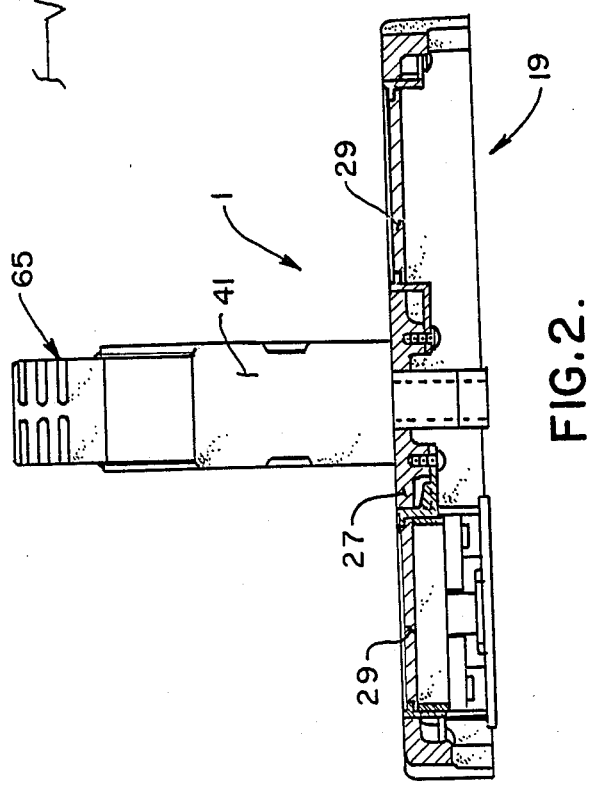

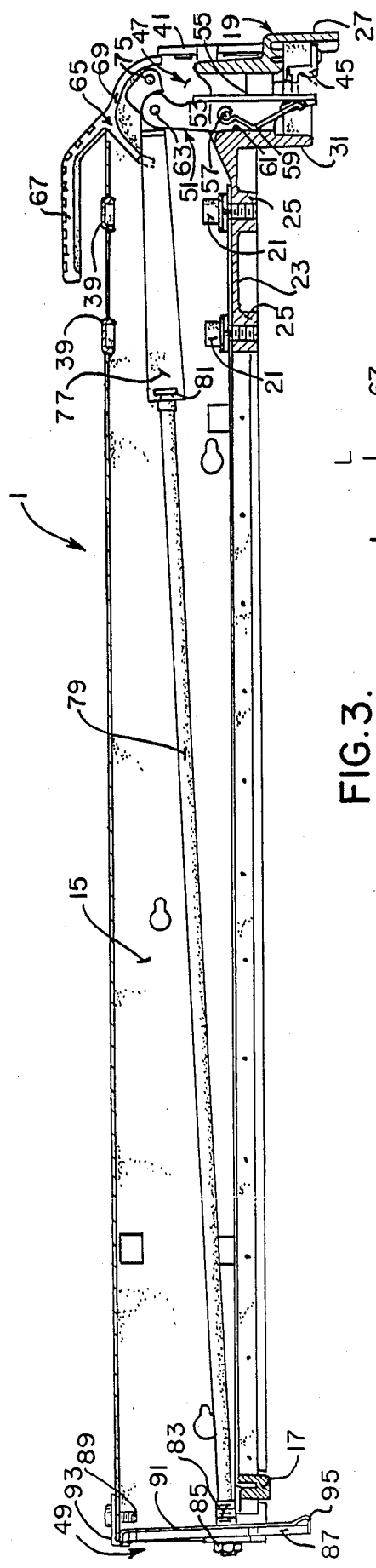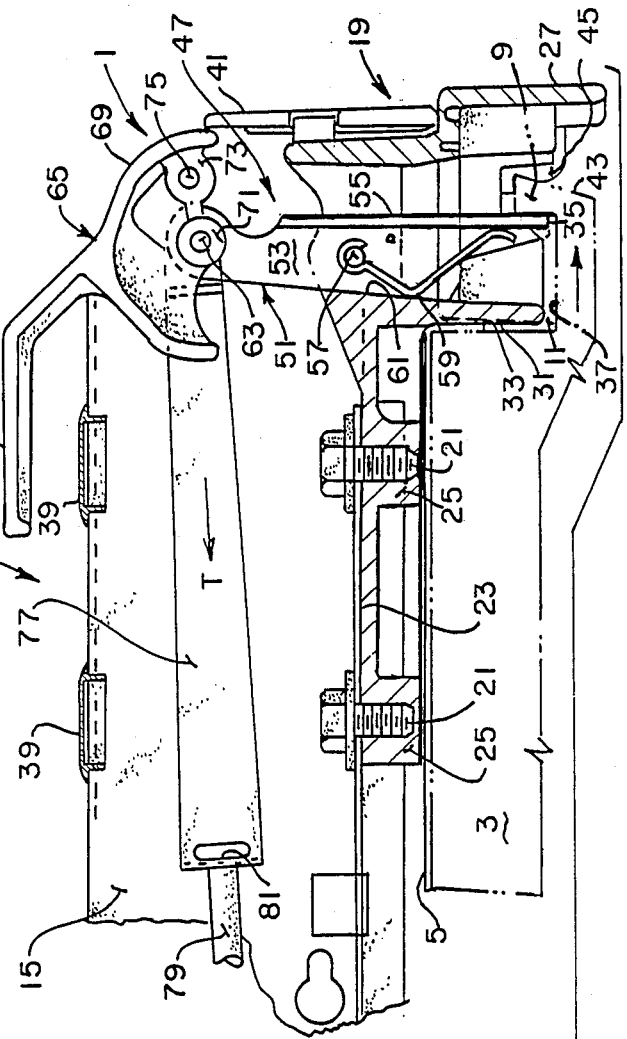
FIG.3.
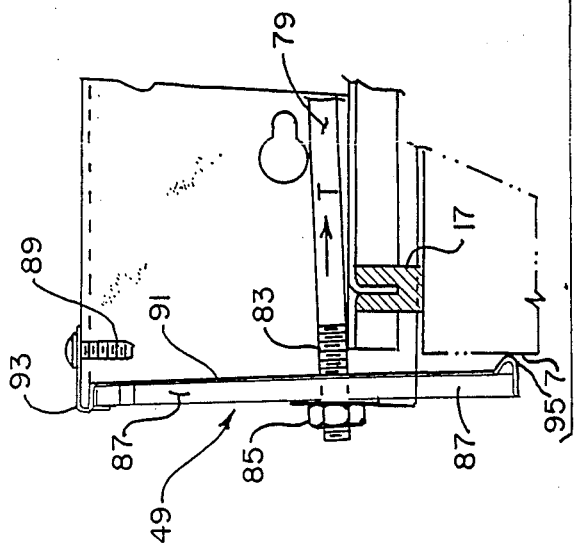
FIG.4.

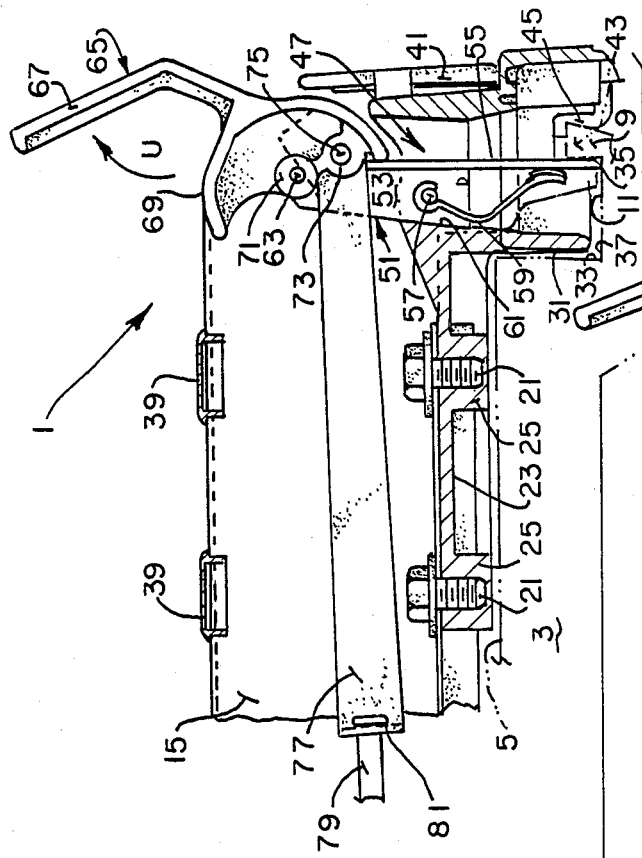
FIG. 5.
FIG. 6.
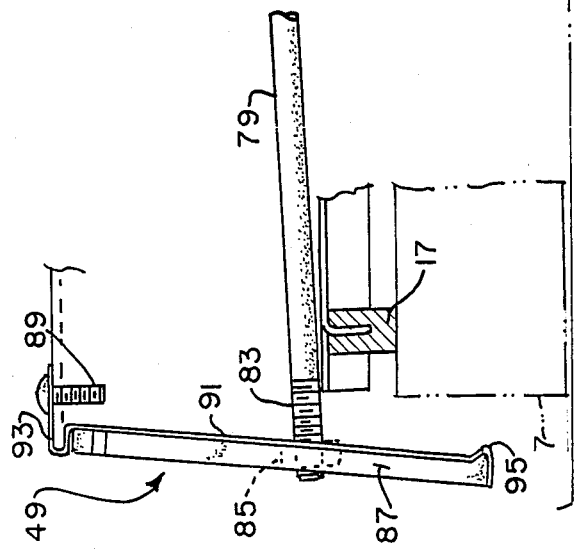

RIP FENCE FOR TABLE SAW

BACKGROUND OF THE INVENTION

The present invention relates to a rip fence for a table saw, band saw or the like which permits longitudinal or rip cutting of a workpiece, and more particularly, to an adjustable, locking and releasable rip fence for use with a table saw.

Table saws have a rotating saw blade extending through their upper surface for cutting workpieces positioned on the upper surface of the table saw. Typically, table saws are used for cross cutting (transverse cutting to the length of the workpiece), bevel cutting (at an angle to the length of the workpiece), and rip cutting (longitudinal along the length of the workpiece). For cross cutting and bevel cutting, an angularly and laterally adjustable fixture or fence is used, whereas for rip cutting, a separate rip fence must be used to hold the workpiece in the desired position for the longitudinal or rip cutting that is to be performed.

The present invention is directed to a new and improved rip fence for table saws, and therefore, the discussion that follows will be limited solely to table saw rip fences.

Prior art rip fences have worked quite well in providing a guide fence that holds a workpiece relative to the rotatable saw blade for longitudinal or rip cutting. As will be expected, it is quite important that the rip fence be securely positioned to hold the workpiece relative to the rotatable saw blade, without movement, while also permitting the rip fence to be properly and accurately adjusted relative to the rotatable saw blade for accurate longitudinal or rip cutting. Prior art designs have not worked as well as desired in both securely retaining the rip fence in the desired position, while at the same time permitting adjustment of the rip fence to the desired location. In addition, the prior art designs are easily moved out of squared relationship to the table saw during adjustment. Some examples of prior art designs include a rotating screw, turned by a rotatable handle, to draw front and rear clamps into engagement with corresponding front and rear surfaces of the table saw. Other designs have included a pivoting handle that brings the front and rear clamps into clamping engagement. When the prior art designs are in the proper position, they have worked well in serving as an appropriate guide fence for longitudinal or rip cutting. However, adjusting and simultaneously maintaining the rip fence in a squared relationship relative to the table saw has been a continuing problem with prior art designs. Springs sometimes used with prior art designs, to maintain the rip fence in a squared relationship with the table saw, can interfere with convenient removal and reinstallation of the rip fence.

SUMMARY OF THE INVENTION

Among the several objects and advantages of the present invention include:

the provision of a new and improved rip fence for use with a table saw;

the provision of the aforementioned rip fence which securely retains the rip fence in the desired position, without movement, by simultaneous releasable clamping engagement of front and rear clamps relative to corresponding surfaces of the table saw;

the provision of the aforementioned rip fence which also permits adjustment of the rip fence to the rotatable saw blade of the table saw, as desired, while maintaining a squared relationship to the table saw;

the provision of the aforementioned rip fence which is also quickly and easily released and removed from the table saw when not in use.

the provision of the aforementioned rip fence which affords locking, unlocking and release of the rip fence relative to the table saw through operation of a single handle mechanism which, dependent on its position, performs the aforementioned functions with facility and ease; and the provision of the aforementioned rip fence which is adaptable to existing table saws, is user-friendly, repeatedly and continuously operates as desired, is simple and easy to operate, utilizes a minimum number of parts, is constructed for long lasting use, is made from durable materials, and is otherwise well adapted for the purposes intended.

Briefly stated, the rip fence of the present invention is constructed for use in a table saw having an upper surface with a rotatable saw blade extending therethrough, a rear surface and a front guide rail on an opposite side of the upper surface from the rear surface. The rip fence includes a fence section which extends across the upper surface of the table saw for supporting a workpiece relative to the rotatable saw blade of the table saw. Front and rear clamps depend from opposite ends of the fence section for releasable clamping engagement with the front guide rail and rear surface of the table saw. A locking handle is operably connected to the front and rear clamps for simultaneous locking engagement and unlocking disengagement relative to the aforementioned respective surfaces of the table saw. Spring means are provided for resiliently engaging the front guide rail when the locking handle is in unlocked position to maintain the fence section in squared relationship to the front guide rail, while permitting adjustment of the fence section relative to the table saw along the front guide rail. For releasing the rip fence from the table saw, means are provided for imparting a compressive force to the spring means opposite to its normal biasing in force, thereby to permit removal of the entire rip fence from the table saw. The aforementioned spring means may be operably connected to the front clamp. Second spring means may be operably connected to the rear clamp for applying a biasing force to the rear surface of the table saw when the rear clamp is clamped thereagainst. An adjustable connecting rod may be operably connected to the locking handle and the front and rear clamps for simultaneous operation thereof.

These and other objects and advantages of the present invention will become more apparent from the description that follows.

BRIEF DESCRIPTION OF THE DRAWINGS

In the drawings, FIG. 1 is a top plan view of a rip fence constructed in accordance with the teachings of the present invention, as shown in use on a table saw having a rotatable saw blade;

FIG. 2 is an end elevational view, partly in section, of the rip fence shown in FIG. 1;

FIG. 3 is a side elevational view, partly in section, of the rip fence of the present invention;

FIG. 4 is an enlarged fragmentary side elevational view of the rip fence, when in locked position, and illustrating the manner in which the front and rear clamps engage corresponding surfaces of the table saw;

FIG. 5 is an enlarged fragmentary side elevational view, partly in section, showing the rip fence in unlocked position with corresponding positions of the front and rear clamps, when unlocked; and FIG. 6 is also an enlarged fragmentary side elevational view, partly in section and illustrating the rip fence when in released position, thereby enabling the rip fence to be totally removed from the table saw for storage.

Corresponding reference numerals will be used throughout the several figures of the drawings.

BRIEF DESCRIPTION OF THE PREFERRED EMBODIMENT

FIGS. 1-3 of the drawings show the construction of the rip fence 1 of the present invention and the environment in which it is used, and FIGS. 4-6 illustrate the locked, unlocked, and released positions, respectively, of the rip fence 1.

As illustrated in FIG. 1 of the drawings, the rip fence 1 is constructed for use in connection with a table saw 3 having an upper surface 5 upon which the rip fence 1 is mounted, and a rear surface 7, a front guide rail 9 on an opposite side of the upper surface 5 from the rear surface 7, and an elongated guide slot 11 adjacent the front guide rail 9.

A rotatable saw blade 13 is shown in FIG. 1 as extending upwardly through the upper surface 5 of the saw table 3 to cut workpieces moved in position, for cutting thereby.

For use with the saw table 3, the rip fence 1 includes an elongated channel-shaped fence section 15 which extends across the upper surface 5 of the saw table 3 to guide and support workpieces relative to the rotatable saw blade 13 for longitudinal or rip cutting of the workpieces, as will be appreciated. At the rear end of the elongated channel-shaped fence section 15 is a fence glide pad 17 that supports the rip fence 1 upon the upper surface 5 of the saw table 3. The fence glide pad 15 both supports the rip fence 1 when the rip fence is secured in a fixed position relative to the rotatable saw blade 3, and is preferably made from a plastic lubricious material to permit slidable movement along the upper surface 5 of the table saw 3, for adjustment of rip fence 1 relative to the rotatable saw blade 13.

At the front end of the elongated channel-shaped fence section 15 is a fence head 19 which is connected thereto such as by the threaded fasteners 21. The fence head 19 is preferably made from as a one-piece casting which includes a longitudinal portion 23 containing the threaded nut-type of ferrule sections 25, 25 for receiving the threaded fasteners 21, 21 to connect the rip fence head 19 to the fence section 15, as best seen in FIG. 3 of the drawings.

The principal portion 27 of the fence head 19 extends transverse to the fence section 15 and contains the components which engage the front guide rail 9 and elongated guide slot 11 of the table saw 5, as well as provide releasably clamping engagement with the rear surface 7 of the table saw 3, as will hereinafter be described.

As best seen in FIGS. 1-2 of the drawings, the transverse section 27 of the fence head 19 includes filler plates 29, 29, which are used as indicia plates for the name of manufacturer etc. The transverse section 27 of the fence head 19 may be provided with a depending finger portion 31 and extends within the elongated guide slot 11 adjacent an internal wall surface 33 of the elongated guide slot 11 which is spaced from and generally parallel to an internal wall surface 35 at the other end of the elongated slot 11, forming the innermost surface portion of the front guide rail 9. Plug buttons 39, 39 may be usefully employed in the elongated channel-shaped fence section 15 to facilitate quick removal thereof, in order to enable a tool to be inserted within the openings covered by the plug buttons 39, 39, for engagement with the threaded fasteners 21, 21 for assembly/adjustment, as appropriate. Also, a generally planar-shaped cap 41 may be suitably attached to the transverse section 27 of the fence head 19 to cover and protect operating components within the fence head 19, hereafter described.

As illustrated in FIGS. 4-6, the front guide rail 9 is shown with a tapered front face 43, and it will be noted in FIG. 3 of the drawings, that the transverse head section 27 has a corresponding complementary-tapered portion or glide 45. When the rip fence 1 is locked in place, as will be discussed hereafter, the complementary, interfitting connection between the tapered portion 45 of the fence head 19 and the tapered front face 43 of the front guide rail 9 provides additional locking security for the rip fence 1, as will be understood. In addition, the portion or glide 45 engages the uppermost surface of front guide rail 9 to support the fence head 19.

In order to provide locking, unlocking and total release of the rip fence 1 relative to the table saw 3, rip fence 1 is provided with front and rear clamps 47,49 respectively which depend from opposite ends of the fence section 15. The front clamp 47 is constructed to engage the inner wall surface 35 of the front guide rail 9, while the rear clamp 49 is constructed to engage the rear surface 7 of the table saw, as will become apparent.

First referring to the front clamp 47, it will be seen that the front clamp 47 includes a spring-biased lever 51 including a vertically extending body portion 53, which may be formed in a U-shaped configuration with identical portions 53. Integral with the vertically extending body portion 53 is a vertically extending clamping surface 55 which extends generally transverse to the body portion 53. The elongated body portion 53 of the spring biased lever 51 is pivotally mounted to the transverse section 27 of the fence head 19 at the pivot 57. Also pivotally mounted upon the pivot 57 is a clamp spring 59 that is appropriately configured, as shown, for engaging an inner wall surface 61 the transverse section 27 of the fence head 19 so as to resiliently bias and engage the clamping portion 55 of the spring biased lever 51, and normally urge the clamping portion 55 into spring biased contact with the inner wall surface 35 of the front guide rail 9. Thus, the spring-bias lever 51 is normally biased by the clamp spring 59 so as to urge the clamping portion 55 thereof into releasable clamping engagement with the inner wall surface 35 of the guide rail 9. In so operating, both the spring biased lever 51 and the clamp spring 59 are pivotally mounted about the pivot 57.

At the upper end of the spring biased lever 51 is a second pivot 63, for pivotally mounting the locking handle 65 thereto. The locking handle 65 includes a locking lever arm 67 which is integrally connected to an arcularly shaped handle element 69 having first and second pivot mounts 71, 73 integral therewith. The first pivot mount 71 of the arcularly shaped 69 receives the pivot pin 63, for pivotally mounting the handle 65 to the upper end of the spring biased lever 51, as seen in FIGS. 3-6 of the drawings. The second pivot mount 73 receives a pivot pin 75, to which the U-shaped connecting bracket 77 and associated connecting rod 79 are pivotally mounted. It will be noted that the connecting rod 79 has an enlarged head 81 for engaging connecting bracket 77 at one end, and a threaded opposite end 83, for threadably receiving the adjusting nut 85.

Prior to mounting the adjusting nut 85 on the threaded end 83 of the connecting rod 79, the rear clamp 49 is first mounted over the threaded end section 83 of the connecting rod 79, and then the adjusting nut 85 is threaded in place to maintain the rear clamp 49 in position.

The rear clamp 49 includes a spring biased clamping plate 87 which is also pivotally mounted by the threaded fastener 89 to the fence section 15. Note in FIGS. 5 and 6 that the spring biasing holds the clamping plate 87 away from the table 7 for ease of installing the fence 1. The spring bias is overcome by the force from the connecting rod 79. The spring biased clamping plate 87 includes a spring element 91 having an upper end 93 engaged by the threaded fastener 89 and a spring foot section 95 at the lower end of the spring element 91. Thus, when the rear clamp 49 is brought into clamping engagement with the rear surface 7 of the table saw 3, the foot section 95 applies a force on the rear surface 7, in order to lock the clamping plate 87 between the rear surface 7 of the table saw 3 and the adjusting nut 85, as will be appreciated.

Reference is now made to FIGS. 4–6 of the drawings for a specific description of the function and operation of the aforementioned components in locking, unlocking and totally releasing the rip fence 1 from the table saw 3. FIG. 4 illustrates the rip fence 1 in locking position; FIG. 5 illustrates the rip fence 1 in unlocked position; and FIG. 6 illustrates the rip fence 1 in released position, for removal from the table saw 3.

As has been discussed above, the connecting bracket and rod 77, 79 respectively, form an adjustable connection between the front and rear clamps 47, 49 respectively. Thus, as the handle 65 is rotated about the pivot pin 63 on its pivotal mounting at the upper end of the spring bias lever 51, the relative position of the pivot pin 75, which pivotally mounts the connecting bracket and rod 77, 79 to the handle 65, moves in an arcuate path about the pivot pin 63, as will be seen in FIGS. 4–6 of the drawings. This is important in providing the desired locking, unlocking and release of the rip fence 1 relative to the table saw 3.

In FIG. 4 of the drawings, with the locking handle 65 being rotated in a counter clockwise position, as shown by the arrow L, the connecting bracket and rod 77, 79 respectively are placed under tension, as illustrated by the arrows, which will act to pull the rear clamp 49 against the rear surface 7 of the table. The tension T also urges pivot pin 75, the handle 65, pivot pin 63 and the upper end of the spring bias lever 51 towards the rear surface 7 of the table saw 3, thus pivoting the spring biased lever 51 around pivot pin 57 and causing the lower end of the spring biased lever 51 to be forced against the inner wall surface 65 of the front guide rail 9. As a result, both the front and rear clamps 47, 49 respectively are simultaneously brought into releasable clamping engagement with the inner wall surface 35 of the front guide rail and the rear surface 7, for fixedly mounting the rip fence 1 in a secure and locked position relative to the table saw 3. The amount of clamping engagement for the front and rear clamps 47, 49 respectively may be adjusted by the adjusting nut 85 on the rear of the connecting rod 79.

The locking handle is retained in the locked position, as illustrated in FIG. 4 of the drawings, by the "over center" condition of the pivot pin 75 being located slightly above pivot pin 63. This "over-center" position, coupled with tension T in the connecting bracket and rod 77, 79 respectively, tends to rotate the locking handle 65 in a counter clockwise direction to keep it in the locked position, as illustrated.

When it is desired to unlock the rip fence 1 from the table saw 3, the locking handle 65 is moved in a clockwise direction as shown by the arrow U in FIG. 5 of the drawings, causing the locking handle 65 to pivot about the pivot pin 63. With this clockwise unlocking movement of the locking handle 65, the pivot pin 75 moves in the arcuate path below the pivot pin 65, and the pivot pin 75 and the connecting bracket and rod 77, 79 respectively are moved toward the rear of the table saw 3. This relieves the tension in the connecting bracket and rod 77, 79 respectively and also releases the rear clamp 49 from clamping engagement with the rear surface 7 of the table saw 3. The forces on the spring biased lever 51 are also relieved, but the clamping portion 55 of the spring biased lever 51 is held against the inner wall surface 35 of the front guide rail 9 by pressure from the clamp spring 59. As a result, the rip fence 1 may be moved from side-to-side along the elongated guide slot 11, to select the desired longitudinal or rip cutting width. The spring pressure for the clamp spring 59 is chosen to permit reasonably free side to side motion, while keeping the clamping portion 55 of the spring bias lever 51 in close contact with the inner wall surface 35 of the front guide rail, so as to maintain the rip fence 1 in squared relationship to the saw table. In some prior art designs, when the rip fence was unlocked from the table saw, the squared relationship therebetween was immediately lost, whereas in the present invention, a constant spring pressure afforded by the clamp spring 51 causes the clamping portion 55 of the spring biased lever 51 to be normally and resiliently urged against the internal wall surface 35 of the front rail guide 9, so as to maintain the squared relationship of the rip fence 1 relative to the table saw 3, while also permitting adjustment of the fence section 15 relative to the table saw 3 along the front guide rail 9, for the appropriate adjustment desired. It will be noted that in the unlocked position as illustrated in FIG. 5, a portion of the arcuately shaped handle 69 and/or pivot pin 75 may be brought against the spring biased lever 51 to prevent further clockwise motion of the locking handle 65 relative to the spring biased lever 51.

If it is desired to release and totally remove the rip fence 1 from the table saw 3 for storage and subsequent use, the locking handle 65 is further rotated about the pivot pin 63 in a clockwise direction as shown by the arrow R in FIG. 6 of the drawings. When this occurs, both the locking handle 65 and the spring biased lever 51 pivot together around pivot pin 57, and this causes compression of the clamp spring 59 as shown by the compressive force arrow C, thereby releasing the spring biased lever 51 from clamping engagement with the internal wall surface 35 of the front guide rail 9. This enables the rip fence 1 to be easily removed vertically from the table saw 3.

From the foregoing, it will now be appreciated that the rip fence of the present invention may be securely locked in position relative to the table saw, unlocked from the table saw while permitting adjustment of the rip fence relative to the table saw and maintaining a squared relationship therebetween, and finally released and removed from the table saw for storage purposes.

In view of the above, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

We claim:

1. A rip fence for use in a table saw or the like having an upper surface with a rotatable saw blade extending therethrough, a rear surface and a front guide rail on an opposite side of said upper surface from said rear surface, said rip fence comprising:

a fence section which extends across the upper surface of the table saw for supporting a workpiece relative to the rotatable saw blade of the table saw;

a rear clamp depending from the fence section at one end for releasable clamping engagement with the rear surface of the table saw;

a front clamp depending from the other end of the fence section and including a spring biased lever for resiliently engaging said front guide rail with sufficient spring pressure to maintain the fence section in squared position relative to said front guide rail while permitting adjustment of the fence section relative to the table saw along said front guide rail; and a locking handle operably connected to said front and rear clamps for simultaneous releasable clamping engagement with the front guide rail and rear surface of said table saw to hold the fence section in a fixed position following adjustment to the desired position.

2. The rip fence as defined in claim 1 wherein said locking handle is also operably connected to said spring biased lever for releasably clamping same against the front guide rail to hold said fence section in a fixed position during use of the rotating saw blade.

3. The rip fence as defined in claim 2 and including a rip fence head at the front end of said fence section in which said front clamp and locking handle are mounted, the spring biased lever of said front clamp being pivotally mounted to said rip fence head, and said locking handle being pivotally mounted to said spring biased lever.

4. The rip fence as defined in claim 3 wherein said locking handle is also pivotally connected to an adjustable connecting rod extending between said locking handle and said rear clamp.

5. The rip fence as defined in claim 4 wherein said rip fence head includes a depending finger portion extending within an elongated guide slot adjacent said front guide rail, said depending finger portion being positioned adjacent an internal wall surface of said elongated guide slot spaced from said front guide rail, and said spring biased lever being adapted to engage an internal wall surface of said front guide rail which is generally parallel to the internal wall surface of said elongated slot.

6. The rip fence as defined in claim 5 wherein the spring biased lever includes a spring biased against the rip fence head to resiliently urge the spring biased lever to engage the internal wall surface of the front guide rail for adjustment of the fence section relative to the rotating saw blade.

7. The rip fence as defined in claim 6 wherein said locking handle is also pivotally mounted on said spring biased lever to apply, when rotated to a released position, a compressive force on the spring through the spring biased lever in a direction opposite to the biasing force of the spring to permit removal of the entire rip fence from the table saw.

8. The rip fence as defined in claim 7 wherein the rear clamp is also pivotally mounted to the rip fence and includes a spring biased clamping plate which is releasably clamped to the rear surface of the table saw.

9. The rip fence as defined in claim 8 wherein the spring biased clamping plate includes a spring element which engages and applies a biasing force against the rear surface of the table when the spring biased clamping plate is clamped thereto.

10. The rip fence as defined in claim 9 wherein the adjustable connecting rod extends through the spring biased clamping plate and includes adjustment means mounted thereto for adjusting the amount of clamping pressure to be applied through the front and rear clamps to the front guide rail and rear surface of the table saw.

11. A rip fence for use in a table saw or the like having an upper surface with a rotatable saw blade extending therethrough, a rear surface and a front guide rail on an opposite side of said upper surface from said rear surface, said rip fence comprising:

a fence section which extends across the upper surface of the table saw for supporting a workpiece relative to the rotatable saw blade of the table saw;

front and/rear clamps depending from opposite ends of said fence section for releasable clamping engagement with the front guide rail and rear surface of said table saw;

a locking handle operably connected to said front and rear clamps for simultaneous locking engagement and unlocking disengagement relative to said aforementioned respective surfaces of said table saw; and spring means for resiliently engaging said front guide rail when the locking handle is in unlocked position to maintain the fence section in squared relationship to the front guide rail while permitting adjustment of the fence section relative to the table saw along the front guide rail.

12. The rip fence as defined in claim 11 including means imparting a compressive force to the spring means opposite to its normal biasing force to permit removal of the entire rip fence from the table saw.

13. The rip fence as defined in claim 12 wherein said spring means is operably connected to said front clamp.

14. The rip fence as defined in claim 13 including second spring means operably connected to said rear clamp for applying a biasing force to the rear surface of the table saw when clamped thereagainst.

15. The rip fence as defined in claim 14 and including an adjustable connecting rod operably connected to said locking handle and said front and rear clamps for simultaneous operation thereof.

16. A rip fence for use in a table saw or the like having an upper surface with a rotatable saw blade extending therethrough, a rear surface, a front guide rail on an opposite side of said upper surface from said rear surface, and an elongated guide slot adjacent the front guide rail, and said rip fence comprising:

a fence section which extends across the upper surface of the table saw for supporting a workpiece relative to a rotatable saw blade of the table saw;

a rear clamp depending from the fence section at one end for releasable clamping engagement with the rear surface of the table saw;

a rip fence head section connected to the other end of the fence section and including a depending finger portion, a front clamp and a locking handle;

said depending finger portion extending within the elongated guide slot and being adjacent an internal wall surface of the elongated guide slot spaced from the front guide rail;

said front clamp being positioned to engage an internal wall surface of the front guide rail which is generally parallel to the internal wall surface of said elongated slot;

said locking handle being operably connected to said front and rear clamps for simultaneous locking and unlocking engagement with the front guide rail and rear surface of said table saw; and spring means for resiliently maintaining said front clamp in slidable contacting relationship with said front guide rail when said locking handle is in unlocked position to provide a squared relationship of the fence section relative to the front guide rail while permitting adjustment of the fence section relative to the table saw along the front guide rail.

17. The rip fence as defined in claim 16 wherein said front clamp includes a lever and associated spring pivotally mounted on said rip fence head, said spring being biased against the rip fence head to resiliently urge the pivotally mounted lever into engagement with the internal wall surface of the front guide rail for adjustment of the fence section relative to the rotating saw blade.

18. The rip fence as defined in claim 17 wherein the locking handle is pivotally mounted to the pivotally mounted lever of the front clamp at an upper end thereof, said locking handle being pivotally mounted to an adjustable connecting rod extending between said locking handle and adjustable connecting rod moving in an arcuate path between an upper over-center position, and a lower position below the pivotal mounting of the locking handle and lever, to enable the locking handle to unlock the front and rear clamps relative to the saw table.

19. The rip fence a defined in claim 18 wherein said locking handle when in unlocked position is positioned for additional movement imparting a compressive force on said spring in a direction opposite to the normal biasing force of said spring to permit complete removal of the rip fence from the saw table.

20. The rip fence as defined in claim 19 wherein said rear clamp also includes a spring element associated therewith to apply a biasing force to the rear surface of the table saw when clamped thereagainst.

* * * * *